(12) United States Patent
Varaprasad et al.

(10) Patent No.: US 7,671,856 B2
(45) Date of Patent: Mar. 2, 2010

(54) MEASURING TIMING PARAMETERS OF RGBHV ANALOG VIDEO

(75) Inventors: G. V. Varaprasad, Bangalore (IN); Anindya Dutta, Bangalore (IN)

(73) Assignee: Tektronix, Inc., Beaverton, OR (US)

( * ) Notice: Subject to any disclaimer, the term of this patent is extended or adjusted under 35 U.S.C. 154(b) by 1115 days.

(21) Appl. No.: 11/028,809

(22) Filed: Jan. 3, 2005

(65) Prior Publication Data

US 2006/0146134 A1 Jul. 6, 2006

(51) Int. Cl.
*G09G 5/00* (2006.01)

(52) U.S. Cl. .......................... 345/213; 345/10; 348/465

(58) Field of Classification Search .................. 345/213, 345/10; 348/465
See application file for complete search history.

(56) References Cited

U.S. PATENT DOCUMENTS

| | | | | |
|---|---|---|---|---|
| 7,400,362 B1 * | 7/2008 | Gudmundson et al. | ...... | 348/607 |
| 2006/0158517 A1 * | 7/2006 | Mori et al. | .................. | 348/194 |

* cited by examiner

*Primary Examiner*—Richard Hjerpe
*Assistant Examiner*—Leonid Shapiro
(74) *Attorney, Agent, or Firm*—Francis I. Gray; Michael A. Nelson; Matthew D. Rabdau

(57) ABSTRACT

A unique test pattern is used for measuring timing parameters of RGBHV analog video signals. For horizontal timing a horizontal line includes within an active video region left and right portions at a first level and a central portion at a second level, the left, right and central portions having a defined percentage relationship to the number of pixels of the horizontal line within the active video region. Also optionally included are left and right border portions just prior to and just after the left and right portions respectively. Measurements are done in pixels for the horizontal line from a horizontal sync pulse to each transition of the unique test pattern, and the horizontal timing parameters are derived from such measurements. Likewise for vertical timing a frame includes within the active video region top and bottom portions made up of horizontal lines having a first level for a first half and a second level for the second half, the number of lines in the top and bottom portions having a defined percentage relationship to the number of lines in the active video region. Also optionally included are top and bottom border lines just prior to and just after the top and bottom portions respectively. Measurements are done in lines for the frame from a vertical sync pulse to each transition in line pattern of the unique test pattern, and the vertical timing parameters are derived from such measurements.

4 Claims, 4 Drawing Sheets

MEASURING TIMING PARAMETERS OF RGBHV ANALOG VIDEO

BACKGROUND OF THE INVENTION

The present invention relates to testing of video monitors, and more particularly to a method of measuring timing parameters of RGBHV (red, green, blue, horizontal, vertical) analog video using a special test pattern.

The Video Electronics Standards Association (VESA) is an organization that supports and sets industry-wide interface standards for the PC, workstation, and computing environments. VESA promotes and develops timely, relevant, open standards for the display and display interface industry, ensuring interoperability and encouraging innovation and market growth. In the past decade, the personal computer industry has evolved from the monochrome display of the first personal computer introduced by IBM, through VGA 640×480 16-color, to 1280×1024 and higher pixel graphics systems with color depths up to 24 bits per pixel or 16.8 million colors. The phenomenal growth of graphics capabilities for personal computers and the resulting proliferation of non-compatible products led to the formation of VESA. The VESA Monitor Timing Standard (MTS) sets forth industry standards and guidelines for computer display monitor timing (DMT). In particular the VESA MTS sets forth certain horizontal and vertical requirements.

Currently product manufacturers test their products for compliance with the VESA DMT manually by using a general purpose oscilloscope. There is no test instrument currently available for automatic testing for compliance with the VESA DMT.

What is desired is an automatic method of detecting and measuring horizontal and vertical timing parameters so a manufacturer is assured that its product complies with the VESA standards as they relate to RGBHV analog video.

BRIEF SUMMARY OF THE INVENTION

Accordingly the present invention provides a method of measuring timing parameters for RGBHV analog video using a unique test pattern. For horizontal timing a horizontal line includes within an active video region left and right portions at a first level and a central portion at a second level, the left, right and central portions having a defined percentage relationship to the number of pixels of the horizontal line within the active video region. Also optionally included are left and right border portions just prior to and just after the left and right portions respectively. Measurements are done in pixels for the horizontal line from a horizontal sync pulse to each transition of the unique test pattern, and the horizontal timing parameters are derived from such measurements. Likewise for vertical timing a frame includes within the active video region top and bottom portions made up of horizontal lines having a first level for a first half and a second level for the second half, the number of lines in the top and bottom portions having a defined percentage relationship to the number of lines in the active video region. Also optionally included are top and bottom border lines just prior to and just after the top and bottom portions respectively. Measurements are done in lines for the frame from a vertical sync pulse to each transition in line pattern of the unique test pattern, and the vertical timing parameters are derived from such measurements.

The objects, advantages and other novel features of the present invention are apparent from the following detailed description when read in conjunction with the appended claims and attached drawing.

DETAILED DESCRIPTION OF THE INVENTION

Figure 1:
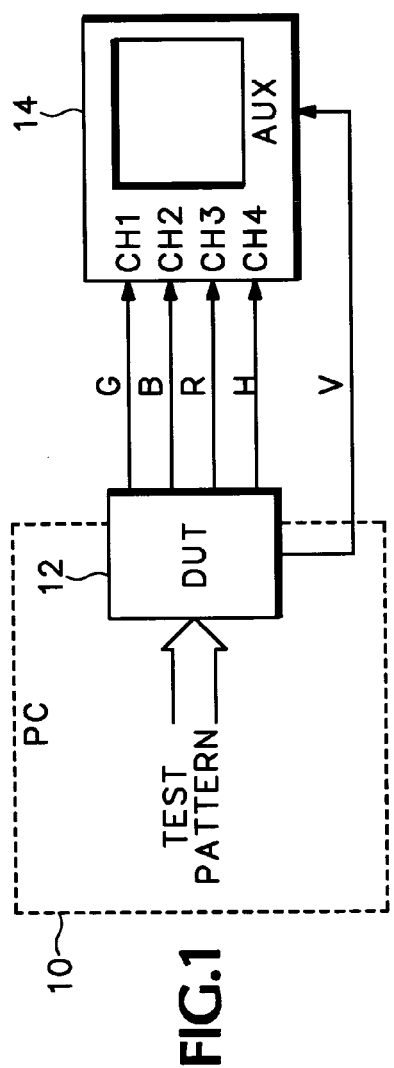
FIG. 1 is a basic block diagram view of a system for measuring timing parameters of an RGBHV analog video according to the present invention.
Figure 2:
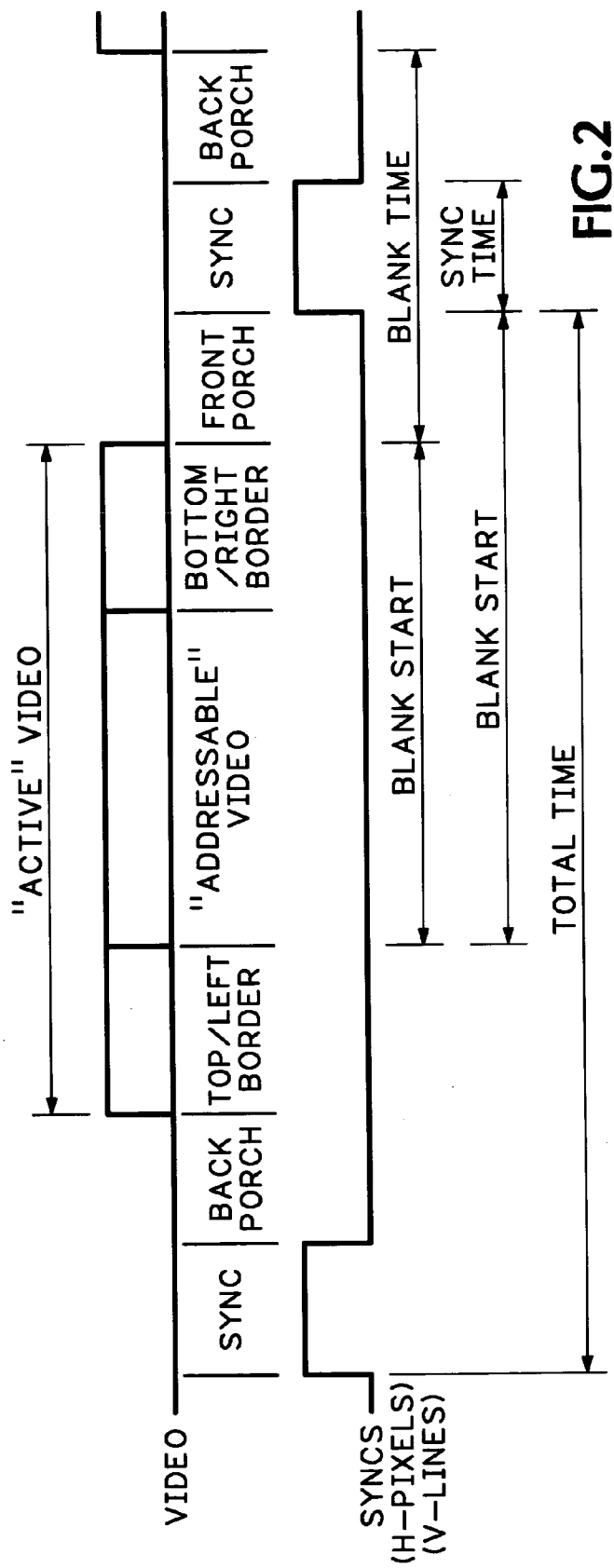
FIG. 2 is a graphic view defining terms used in a specified video display standard.

RGBHV analog video is a five-line video signal—red, green, blue, horizontal sync and vertical sync. These lines from a device under test 12, such as a video graphics card in a personal computer (PC) 10, may be input to respective channels and an auxiliary channel of a four-channel digital oscilloscope 14, such as the VM5000 Automated Video Automated Measurement Set manufactured by Tektronix, Inc. of Beaverton, Oreg., as shown in FIG. 1. The PC 10 generates a unique test pattern internally for the DUT 14. The timing for horizontal and vertical borders is defined by the VESA DMT, and reflected in FIG. 2. For horizontal timing the "active" video is the number of pixels that make up the visual portion of each video line, and for vertical timing the "active" video is the number of lines that make up the visual portion of each video frame. The "total time" reflects the number of pixels per video line or the number of lines per video frame.

Figure 3:
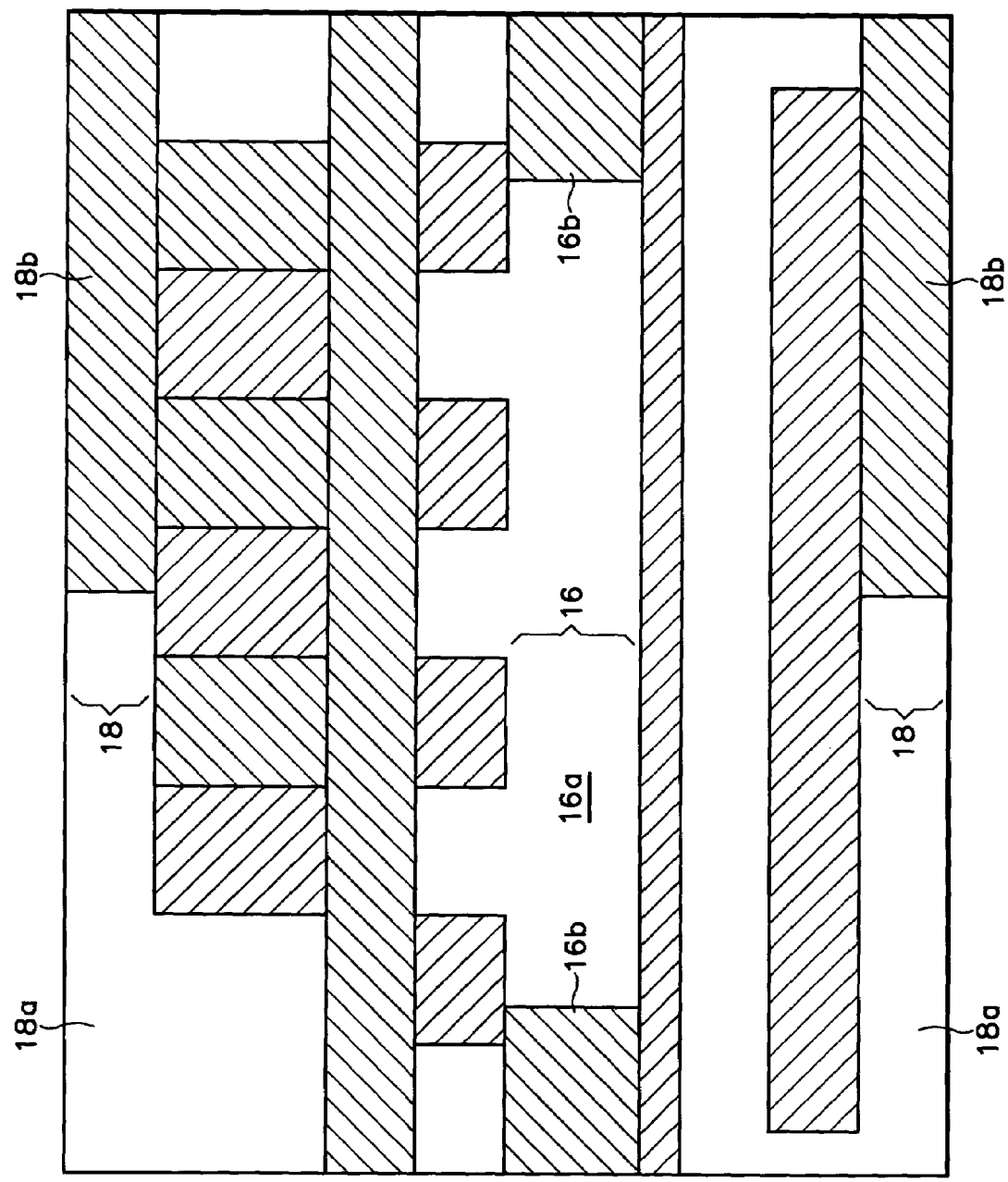
FIG. 3 is a plan view of a unique test pattern for measuring timing parameters of the RGBHV analog video according to the present invention.

The unique test pattern is shown in FIG. 3 and has a portion 16 for horizontal timing and a portion 18 for vertical timing. The horizontal timing portion 16 has a number of horizontal lines that have a central "white" portion 16a with "black" borders 16b at either end. The vertical timing portion 18 has lines had the top and bottom of the frame that have a left "white" portion 18a and a right "black" portion 18b.

Figure 4:
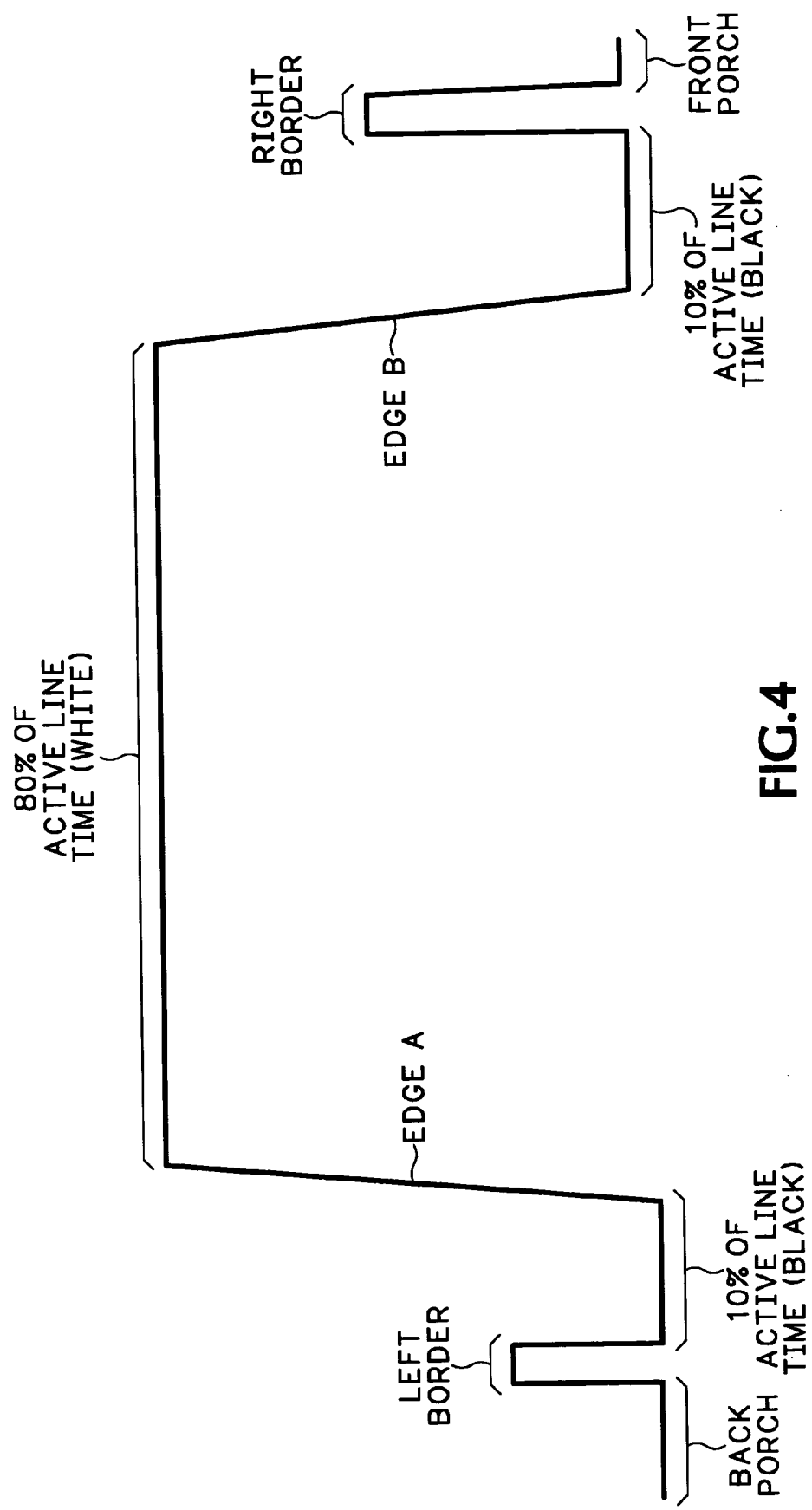
FIG. 4 is a graphic view of the unique test pattern for a horizontal line for horizontal timing parameter measurements according to the present invention.

To measure horizontal timing the instrument 14 is triggered on the trailing edge of every horizontal sync pulse during the horizontal timing portion 16 of the special test pattern 10. An acquired line of the horizontal timing portion 16 is shown in FIG. 4 which has as an example an active video portion that is 10% black followed by 80% white and then by 10% black, where the percentage is of the total number of pixels in the active video. An average amplitude for the black level is measured, as is an average amplitude for the white level. A steady state voltage level is defined as the difference of the white and black average amplitudes, i.e., a step height between black and white levels. The left border in the region starting from the trailing edge of horizontal sync and ending at the leading edge of the white portion is detected at a level determined as greater than 15% of full white level. Then the right border in the region starting from the trailing edge of the white portion and ending at the leading edge of the next horizontal sync pulse is detected. Border width is the time duration of the border, usually on the order of only a few pixels, and is considered to exist when the amplitude is greater than 15% of maximum steady state voltage (full white level). Some of the VESA standards include a border at the left and right portions of the horizontal line at the end of the back porch and start of the front porch, respectively. These borders are detected by determining when the leading and trailing edges occur having an amplitude significantly less than the white level but greater than a minimum threshold, such as the 15% of white level mentioned above. The same step height measurement may be made for each border pulse by averaging the maximum amplitude and subtracting the black level from such maximum amplitude, and the edges of the same technique as described above for the white portion 16a. By counting the number of pixels from the trailing edge of the horizontal sync pulse (trigger point) to each measurement point—leading edge of white level, trailing edge of white level and leading edge of next horizontal sync pulse—the duration of each of the VESA parameters may be determined—back porch, front porch, left border, right border and active (addressable) video. These durations may then be compared with the specified durations of the corresponding VESA standard. Since the unique test pattern is defined as a percentage of the pixels in the active video, the unique test pattern is readily scalable to any VESA standard.

Figure 5:
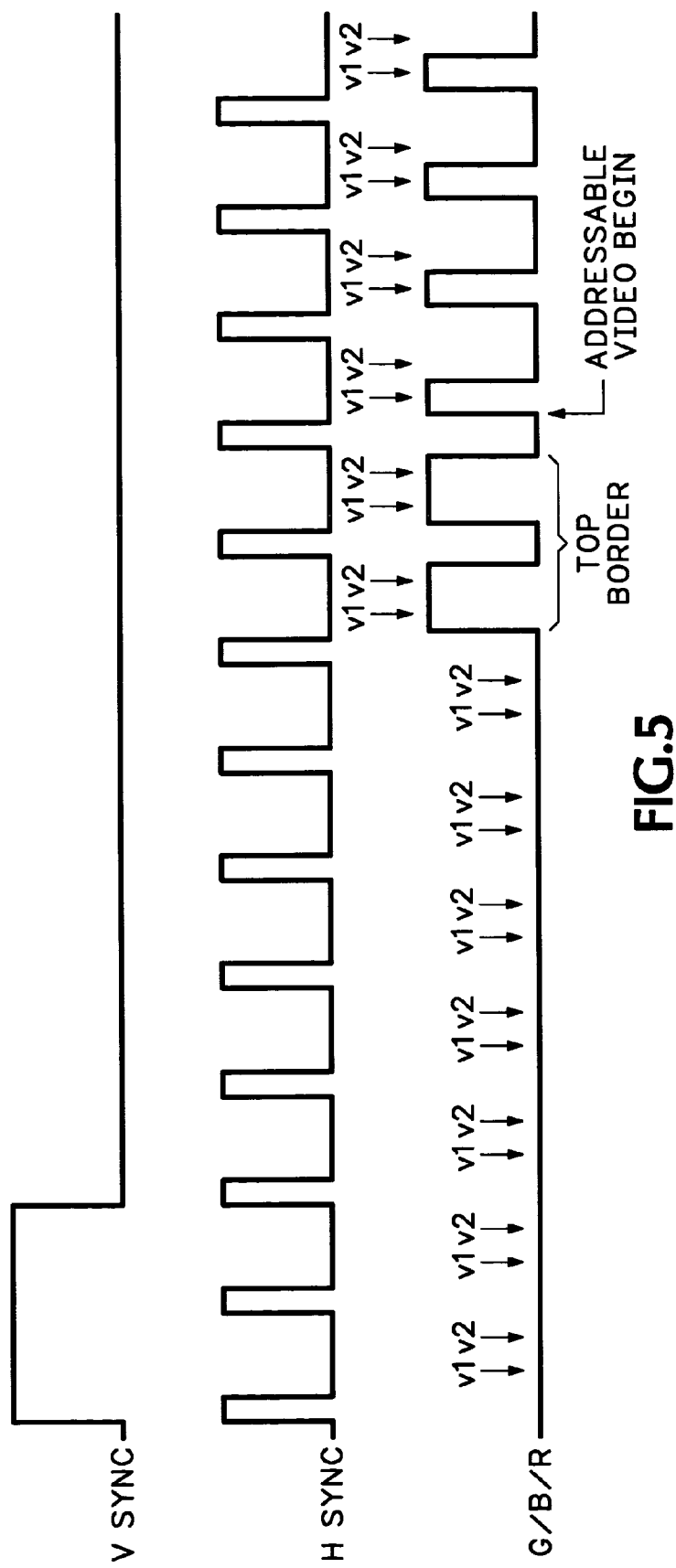
FIG. 5 is a graphic view of the unique test pattern for a frame for vertical timing parameter measurements according to the present invention.

To measure vertical timing the test instrument is triggered by the trailing edge of the $n^{th}$ horizontal sync pulse following the leading edge of a vertical sync pulse. "n" is set to a range of numbers depending on the number of lines in the video frame, as specified by the VESA DMT, so various portions of the frame may be scanned line-by-line for different patterns. The scan is set to begin five lines before the nominal end of the back porch set by the VESA DMT. As shown in FIG. 5, which represents the vertical portion of the unique test pattern, two voltage samples, $v_1$, $v_2$, are taken from each horizontal line, one in the middle of the first half of the video line and the other in the second half. If both $v_1$ and $v_2$ are low (black), the video line is part of the vertical back porch. If both $v_1$ and $v_2$ are high (greater than 15% of white, for example), the video line is a border line. If $v_1$ is high (white) and $v_2$ is low (black) the video line is at the start of the active video lines. Again the number of lines that have the high/low characteristic is specified as a percentage of the number of lines in the active video. Once the back porch, top border (if any) and the start of addressable video (active video lines) are determined, the scan skips most of the addressable video lines and starts again close to the nominal end of addressable video. The process is repeated for the bottom lines—detecting the specific vertical pattern, the border pattern—and the scan continues until start of addressable video of a next frame is found since in some applications the vertical sync is not available for monitoring due to a limited number of oscilloscope patterns. In this limited channel situation the vertical sync is switched temporarily to one of the oscilloscope channels temporarily to get the width of the vertical sync pulse. From this information the number of lines corresponding to the vertical back porch, top border, bottom border, front porch and active (addressable) video may be determined, as the number of lines again are counted for each of the detected transitions in the signal. The number of lines during the vertical sync pulse are determined by temporarily switching the vertical input from the auxiliary input to channel 4 input.

Thus the present invention measures timing parameters of an RGBHV analog video signal for conformance to a specified VESA standard by using a unique test pattern having for horizontal timing at least one line that includes a border pulse at the end of the back porch and again at the start of the front porch (if required by the specified VESA standard) and an active video pattern having a central white level with black borders at each end, the black borders being a specified percentage of the active video region in pixels, and having for vertical timing at least one frame that has at least one border line at the end of the vertical back porch and again at the start of the vertical front porch (if required by the specified VESA standard) and subsequent pattern lines being one-half white and one-half black at the start and end of the active video lines of the frame, the number of white/black lines being a percentage of the active video region in lines.

What is claimed is:

1. A method of measuring timing parameters of an RGBHV analog video signal using an oscilloscope comprising the steps of:

applying a unique test pattern to a device under test that produces the RGBHV analog video signal, the unique test pattern having top and bottom portions of a frame within an active video region, each portion being a horizontal line with a first half at a first level and a second half at a second level;

measuring a number of lines from a vertical sync pulse to a start of the top portion, to an end of the bottom portion, and to a start of a next vertical sync pulse using an oscilloscope; and determining from the measured numbers of lines the timing parameters for the RGBHV analog video signal.

2. The method as recited in claim 1 wherein the unique test pattern further comprises a top border line prior to the top portion and a bottom border line after the bottom portion and the measuring step includes measuring the lines from the vertical sync signal to the top and bottom bands.

3. The method as recited in claims 1 or 2 wherein the unique test pattern comprises left and right portions at a first level and a central portion at a second level of an active video region of a horizontal line with the left, right and center portions having a fixed percentage relationship, the measurement step includes measuring a number of pixels from a horizontal sync pulse to a start of the central portion, to an end of the central portion, and to a start of a next horizontal sync pulse, and the determining step includes determining from the measured numbers of pixels the timing parameters for the RGBHV analog video signal.

4. The method as recited in claim 3 wherein the unique test pattern further comprises a left band just prior to the left portion and a right band just after the right portion, and the measuring step includes measuring to the left and right bands.

* * * * *